INVENTOR
HANS KOK
FRANZ. J. SCHRAMEL
BY
AGENT

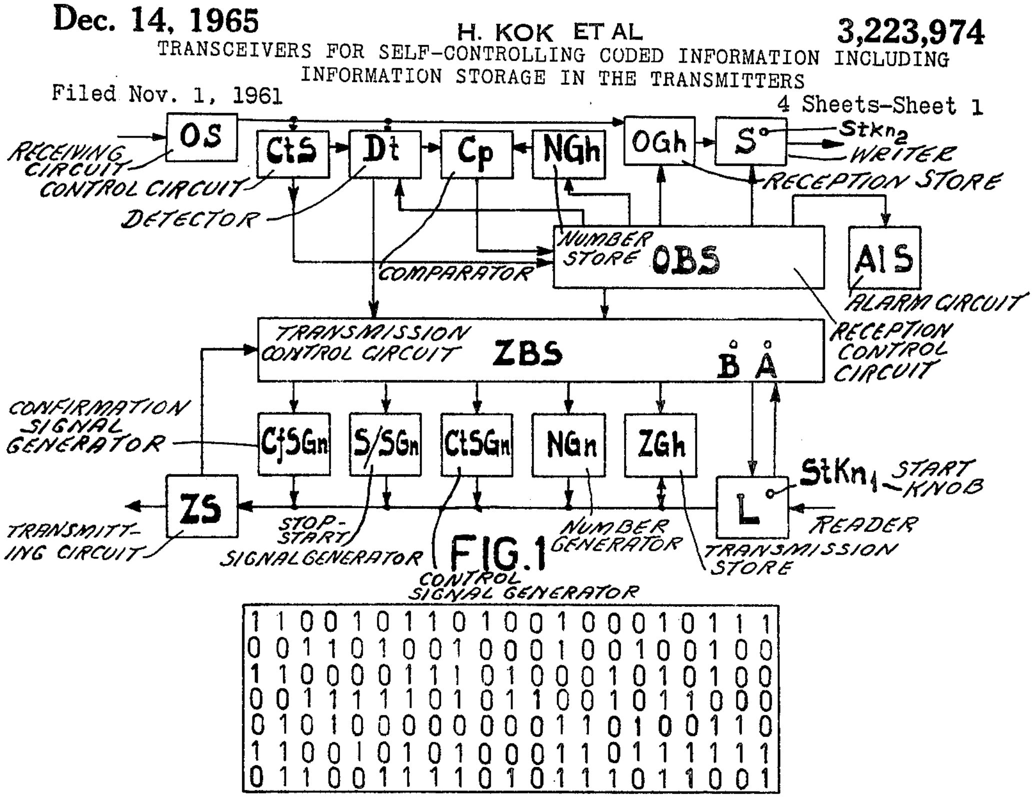
FIG.1
| | | | | | | | | | | | | | | | | | | | | |
|---|---|---|---|---|---|---|---|---|---|---|---|---|---|---|---|---|---|---|---|---|
| 1 | 1 | 0 | 0 | 1 | 0 | 1 | 1 | 0 | 1 | 0 | 0 | 1 | 0 | 0 | 0 | 1 | 0 | 1 | 1 | 1 |
| 0 | 0 | 1 | 1 | 0 | 1 | 0 | 0 | 1 | 0 | 0 | 0 | 1 | 0 | 0 | 1 | 0 | 0 | 1 | 0 | 0 |
| 1 | 1 | 0 | 0 | 0 | 0 | 1 | 1 | 1 | 0 | 1 | 0 | 0 | 0 | 1 | 0 | 1 | 0 | 1 | 0 | 0 |
| 0 | 0 | 1 | 1 | 1 | 1 | 1 | 0 | 1 | 0 | 1 | 1 | 0 | 0 | 1 | 0 | 1 | 1 | 0 | 0 | 0 |
| 0 | 1 | 0 | 1 | 0 | 0 | 0 | 0 | 0 | 0 | 0 | 0 | 1 | 1 | 0 | 1 | 0 | 0 | 1 | 1 | 0 |
| 1 | 1 | 0 | 0 | 1 | 0 | 1 | 0 | 1 | 0 | 0 | 0 | 1 | 1 | 0 | 1 | 1 | 1 | 1 | 1 | 1 |
| 0 | 1 | 1 | 0 | 0 | 1 | 1 | 1 | 1 | 0 | 1 | 0 | 1 | 1 | 1 | 0 | 1 | 1 | 0 | 0 | 1 |
FIG.2
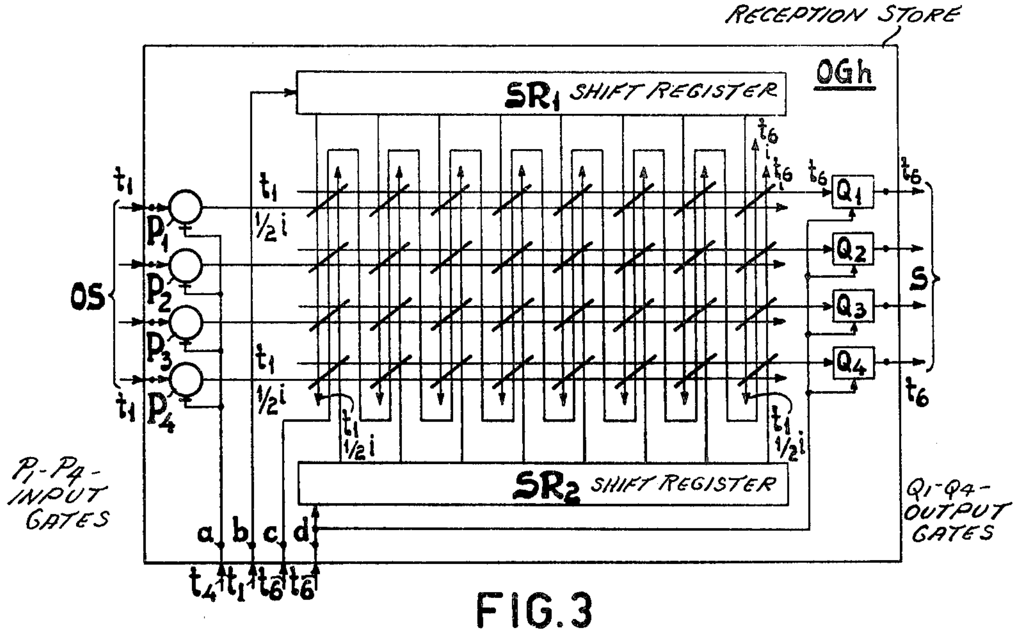
FIG.3
INVENTOR
HANS KOK
FRANZ. J. SCHRAMEL
BY
Frank R. Trifari
AGENT

INVENTOR
HANS KOK
FRANZ. J. SCHRAMEL
BY
Frank R. Jufani
AGENT

INVENTOR
HANS KOK
FRANZ.J.SCHRAMEL
BY
AGENT

United States Patent Office 3,223,974
Patented Dec. 14, 1965

3,223,974
TRANSCEIVERS FOR SELF-CONTROLLING CODED INFORMATION INCLUDING INFORMATION STORAGE IN THE TRANSMITTERS

Hans Kok and Franz Josef Schramel, Hilversum, Netherlands, assignors to North American Philips Company, Inc., New York, N.Y., a corporation of Delaware Filed Nov. 1, 1961, Ser. No. 149,424
Claims priority, application Netherlands, Nov. 3, 1960, 257,589
5 Claims. (Cl. 340—146.1)

This invention relates to systems for the transmission of self-controlling coded digital information through a telecommunication channel, and in particular to such systems in which the transmitter includes a sensing device for reading information from an information carrier and the receiving station includes a control circuit for controlling errors in the incoming information and a confirmation signal generator which transmits a signal back to the transmitting station if the control circuit detects an error in the transmitted information; the transmitting station responds to the signal by repeating part of the information already transmitted by reading it from a transmission store in which the transmitted information is stored for some time.

There is a need for such a device for example in a so-called "point-to-point" connection between two transceiving stations, i.e., two transceiving stations connected together by a fixed line. The apparatus is usually designed so that traffic is possible simultaneously in both directions (duplex connection). Each device transmits the information received through the telecommunication channel to an information carrier, for example a punch tape, punch chart or magnetic tape, and also receives the information to be transmitted through the telecommunication channel from an information carrier. The invention is independent, however, of any further apparatus on the incoming information and of the manner in which it is sensed in the transmitting station. The invention is also independent of the manner in which the elements of a code group corresponding to a symbol to be transmitted (characters, digits, coded words or sentences, etc.) are transmitted and handled; i.e., this may be done simultaneously or in succession. In practical examples the code-elements are usually transmitted in succession, but the code elements belonging to the same code group are handled simultaneously in the receiving station and usually also in the transmitting station. It will be evident that it is important that the information received by the receiving station be wholly identical with the information transmitted by the transmitting station. It is known to use therefor a so-called self-controlling code. Each code group corresponding to a symbol and hence significant satisfies in this case a certain control characteristic, while every single distortion of a significant code group, i.e., the replacement of a code element thereof by another, must result in the code group no longer corresponding to a symbol and hence becoming insignificant. When using a code with binary code elements which may be represented by the digits 0 and 1, the control characteristic may, for example, be such that each code group contains an even (or odd) number of code elements of a value unity.

It is known, especially in radio-communication, to use a self-controlling code and control every incoming code group as to errors in the receiving station with the aid of the control characteristic. If the control circuit in the receiving station detects an error, a predetermined signal is transmitted back to the transmitting station which responds thereto by re-transmitting the two or three code groups last transmitted.

A primary object of the invention is to provide an improvement in the above system which allows the possibility of errors in the transmitted information to become substantially negligible, namely of the order of one error to the $10^{10}$ to $10^{11}$ code groups transmitted.

The invention is particularly suitable for the use of a point-to-point telegraph connection at a high speed of telegraphing. According to the invention, the control circuit of the transmitting station acts to automatically halt the transmission of information when a constant number of code groups, which together form a block of information, has been transmitted. The control circuit of the receiving station controls each incoming block of information as to errors, the confirmation signal generator, after receipt of a block of information, transmitting either the service code group "confirmation good" or the service code group "confirmation wrong" back to the transmitting station, depending on whether the control circuit has found errors in the received block of information. Further, according to the invention, the transmitting station includes a detector which can detect and distinguish the confirmation signals from each other, while the control circuit of the transmitting station is connected to the detector and acts so that upon receipt of the confirmation "good" the next block of information is transmitted by means of the sensing device and upon receipt of the confirmation "wrong" the block of information which has just been transmitted is transmitted again by reading the transmission store.

In order that the invention may be readily carried into effect, it will now be described in detail, by way of example, with reference to the accompanying diagrammatic drawings, in which:

FIGURE 1 shows the block diagram of a transceiver according to the invention;

FIGURE 2 shows an example of a block of information which may be used in the apparatus of the invention;

FIGURES 3 to 8 show possible embodiments of parts of the transceiver shown in block form in FIGURE 1.

Figure 4:
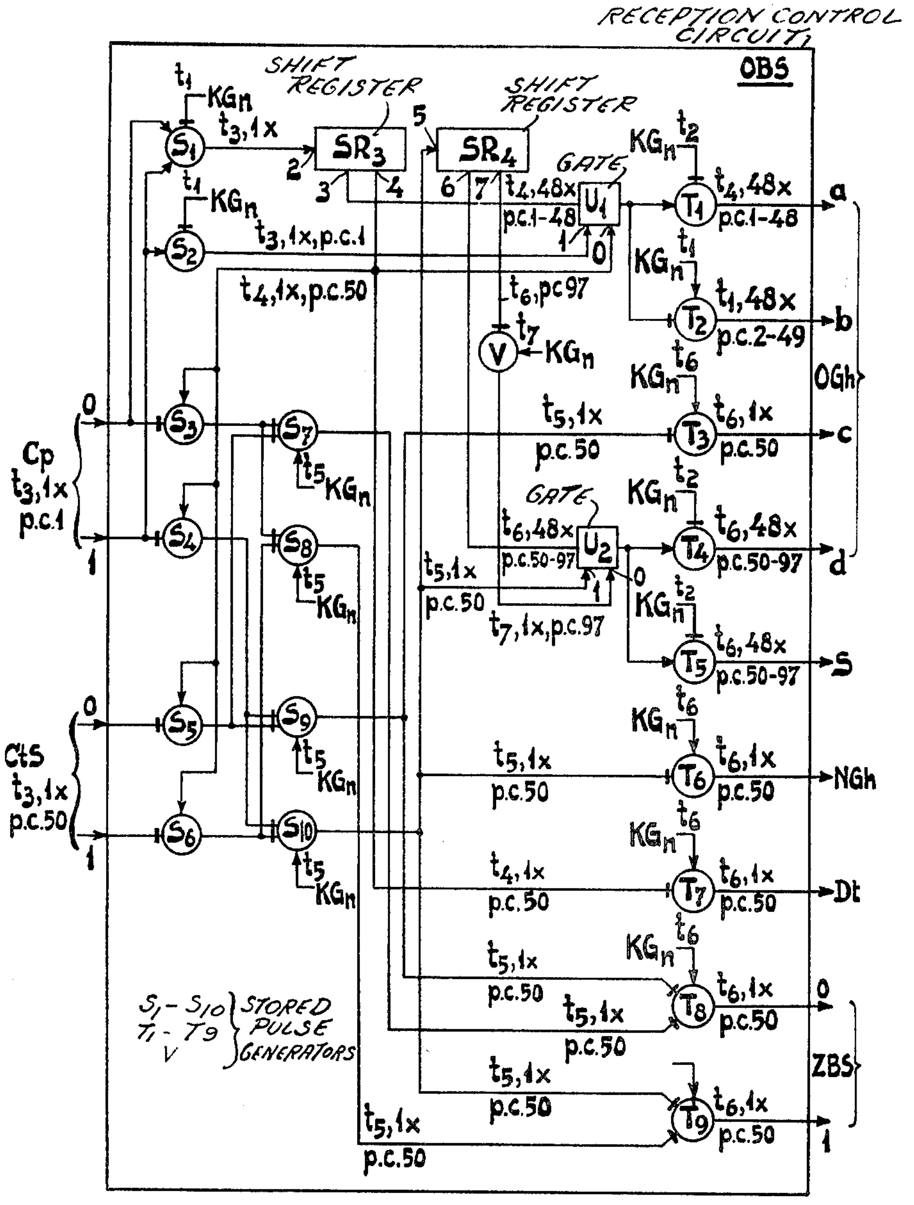

FIGURE 1 shows the block diagram of a transceiver according to the invention. It comprises a transmitting circuit ZS which may be of known design and a receiving circuit OS which may also be of known design. The transmitting circuit ZS brings the output code group by the remaining equipment into a form suitable for transmission. If the code elements which together form one output code group are obtained simultaneously, i.e., in parallel, the transmitting circuit requires a transmission divider; however, this is not necessary if the code elements are transmitted in series, which will be referred to as sequential transmission of the code elements or code groups. The receiving circuit converts the code groups received from the transmission medium into a form suitable for handling in the further equipment. For this purpose, the receiving circuit may comprise a reception divider and a synchronizing circuit. The transmission medium may be, for example, a two-wire or a four-wire telephone line. The invention is independent of the kind of transmission medium and of the form which the transmitting and receiving circuits may take. In the example described, it is also assumed that identical transceivers are present at the two ends of the transmission path, herein referred to as the telecommunication channel, so that traffic may take place simultaneously in both directions, but the invention is also independent of this detail.

The transmitting part of the transceiver also comprises an information source L, a transmission store Z*Gh*, a number generator N*gn*, a control signal generator C*ts*G*n*, a confirmation signal generator C*f*SG*n* and a part ZBS of the control circuit which will be referred to as the transmission control circuit and which controls more particularly the transmission of information. These parts are connected together in the manner shown. The information source L may be, for example, the sensing device of a punch tape. The transmission store ZG*h* serves to store temporarily the information delivered by the information source L, in order to be able to transmit a portion thereof again, if necessary. As previously mentioned, the information is transmitted in the form of blocks of information each containing a constant number of code groups. The number generator NG*n* serves to provide each block of information with an identification number. The control signal generator C*t*SG*n* serves to provide each block of information with a so-called horizontal control symbol, which will be referred to more fully hereinafter. The confirmation signal generator C*f*SG*n* may transmit a signal to the transmitting station to indicate whether this station must transmit the next block of information because no errors have been found in the preceding block, or must re-transmit the block of information last transmitted, because errors have been found in this block. Each of these two signals is transmitted in the form of a special code group. These code groups will be referred to hereinafter as the "confirmation good" and the "confirmation wrong." A stop-start signal generator S/SG*n* may transmit back two other special code-groups to the transmitting station to indicate that it must temporarily stop the transmission of information after the transmission of the block of information just being handled, or that transmission of information which has been temporarily interrupted may be resumed. Such an arrangement is particularly necessary if the information carrier is a punch tape: a signal is necessary to indicate that the punch band in the receiving station is nearing the end and hence must be replaced by a new one. This must be signalled to the transmitting station and also the fact that the transmission may be resumed because a blank punch band has been laid in. All of the above-mentioned signals, i.e., the identification number, the confirmation good, the confirmation wrong, the stop signal and the start signal which, as previously mentioned, correspond to special code groups, are referred to herein as service signals and service code groups respectively.

The receiving portion of the transceiver comprises a control circuit C*t*S, a detector D*t*, a comparator C*p*, a number store NG*h*, a reception store OG*h*, handling equipment S and a part OBS of the control circuit which will be referred to herein as the reception control circuit. The control circuit C*t*S performs error control for every incoming block of information. The detector D*t* can detect and distinguish the service code groups from one another. It transmits the service code groups corresponding to an identification number to the comparator C*p* and the remaining service code groups to the transmission control circuit ZBS of the transmitting portion of the transceiver. The number store NG*h* can store an identification number and increase this number by 1 under control of the reception control circuit. The comparator C*p* tests the numbers delivered by the detector D*t* and the number store NG*h* as to equality or non-equality and signals the result of this comparison to the reception control circuit OBS. The reception store OG*h* serves to store temporarily an incoming block of information. The handling equipment S handles the information delivered by the reception store. This equipment may be, for example, a tape puncher and will be referred to hereinafter as the writer.

From the following description it will appear that the confirmation "good," the confirmation "wrong," the stop signal, and the start signal can never occur midway in a block of information, but are always received between two blocks of information. However, the identification number always forms the first code group of a block of information and thus also carries the information "a block of information begins." Consequently, the apparatus may be designed so that the detector D*t*, upon receipt of an identification number, becomes insensitive to the reception and detection of further code groups, but is made sensitive again by the reception control circuit OBS at the end of a block of information. This affords the advantage that the service code groups may also be used in another significance for the transmission of the information proper. An alternative solution is that the detector D*t* does not become insensitive upon receipt of an identification number, but is made insensitive by the reception control circuit OBS for the duration of a block of information; this can be done, for example, by providing gates at the input of detector D*t* and leading a series of pulses to the detector D*t* which keep the gates closed.

When the equipment is switched on, the writers of the transceivers at the two ends of the telecommunication channel, herein referred to as the end A and the end B, are first provided with blank information carriers and the readers or sensing devices of the transceivers are provided with information carriers containing the information to the transmitted. Then the number store NG*h* and the number generator NG*n* in the two transceivers are adjusted to the same identification number, for example the identification number 0. In the transceiver at the end A the transmission of information to the transceiver at the end B may be initiated by pushing a start knob S*t*K*n*1 provided on the reader L. The first consequence thereof is that the number generator NG*n* of the transceiver in the end A of the transmission control circuit ZBS receives a pulse so that it transmits the identification number 0 and steps to the position 1. In the example here described it is assumed that there are only two service code groups corresponding to an identification number, which are transmitted alternately and will be indicated by the digits 0 and 1. After the number generator NG*n* has transmitted the identification number, the reader L receives a predetermined, constant number of pulses so that a constant number of code groups of the information carrier are read and transmitted, as is the identification number, through the transmitting circuit ZS to the transceiver at the end B. This fixed number may be, for example, 48. After the reader has read and transmitted the determined number of code groups, the control signal generator C*t*SG*n* receives a pulse which causes it to transmit a control signal, hereinafter referred to as the horizontal control signal. The assembly of code groups comprising the service code group indicating the identification number, the constant number of code groups read by the reader and the horizontal control signal together form what has been referred to above as a block of information.

The code group corresponding to the horizontal control signal is determined so that the code elements at each code-element position of the relevant block of information correspond to a certain control characteristic. When using a code with binary code elements, this control characteristic may be for example such that the block of information carries at each code-element position an even (or odd) number of code elements of a value unity. The horizontal control signal is in this case sometimes referred to as the horizontal parity signal. In contrast to this so-called horizontal control, the control of each individual code group is referred to as the vertical control. FIGURE 2 shows an example of a block of information comprising 21 code groups each having 7 binary code elements which are indicated by the digits 0 and 1. The vertical control characteristic consists in that each code group contains an odd number of code elements of a value unity and hence an even number of code elements of a value zero. The horizontal characteristic consists in that the block of information at each code-element position has an odd number of code elements of a value unity and hence an even number of code elements of a value zero. The block of information shown in FIGURE 2 satisfies both control characteristics. The code groups delivered by the number generator NG*n*, the reader L and the control signal generator C*t*SG*n* are not only transmitted through the transmitting circuit ZS to the transceiver in the end B, but also stored in the transmission store ZG*h* so that the whole block of information may be transmitted again, if necessary, without this information having to be read again by the reader from the information carrier. The latter procedure would cause undue delay when using, for example, a punch tape as an information carrier, since this would require backsetting of the punch tape.

The block of information is received in the transceiver at the end B and stored in the reception store OG*h* except for the first and last code groups. However, the code groups are also led to the detector D*t* and the control circuit C*t*S. As soon as the detector D*t* has detected the identification number 0, this number is transmitted to the comparator C*p* and compared therein with the identification number stored in the number store NG*h*. If the transmission has been faithful, the comparator C*p* finds equality of the identification numbers offered by the detector D*t* and the number store NG*h* and signals this result to the reception control circuit OBS. The latter thus knows that a new block of information is arriving. After the detection of the identification number, the detector D*t* has made itself insensitive to the reception and detection of further code groups. As previously mentioned, this makes it possible to use the service code groups also for the transmission of the information proper. The further code groups of the block of information, except the last, which corresponds to the control signal, are stored in the reception store OG*h*. All the code groups of the block of information are also led to the control circuit C*t*S and at the end of the block of information the reception control circuit OBS receives a signal from the control circuit C*t*S which is an indication whether or not the control circuit C*t*S has found an error in the block of information. For the present it is assumed again that no error has been found. The reception control circuit OBS then responds to the signals "equality of numbers has been found" and "no errors have been found" by transmitting a pulse to the number store NG*h*, resulting in the number stored therein being increased modulo 2 by 1. Furthermore a pulse is sent to the transmission control circuit ZBS requesting to transmit back the confirmation "good" to the transceiver in the end A; in addition, enough pulses are sent to the reception store OG*h* so that the information stored therein is completely passed to the writer S and at the same time enough pulses are sent to the writer S so that it writes the information received from the reception store on the information carrier, for example the punch tape. The transmission control circuit ZBS carries out the incoming order through the confirmation signal generator C*f*SG*n* as soon as a block of information just being handled has been completely transmitted. For this purpose the transmitting circuit may comprise a detector which can detect the code group (0000000). This code group does not satisfy the control characteristic and hence does not normally occur in the blocks of information, but may be used as a symbol indicating the information "the transmitting circuit is free" or "the end of a block of information is reached."

After some time the transceiver in the end A thus receives the confirmation "good." The corresponding service code group is detected in the detector D*t*. The transmission control circuit ZBS thus receives a pulse indicating the information that the configuration "good" has been received and responds thereto by erasing the information stored in the transmission store ZG*h* and thus initiating the storage of a subsequent block of information and then actuating successively the number generator NG*n*, the reader L and the control signal generator C*t*SG*n*. Consequently, the next block of information is transmitted.

If transmission has been faithful, the blocks of information successively transmitted thus have the identification numbers 0, 1, 0, 1, 0, 1, . . . . Since the identification number stored in the number store NG*h* is increased modulo 2 by 1 after receipt of every block of information without errors, the comparator C*p* in this case always detects equality. Also a service code group can never occur midway in a block of information. In order to prevent the transmission of a service code group from having to wait for the transmission of a whole block of information and thus unnecessarily delaying the transmission of information, the transmission control circuit is designed so that the service code groups have priority over the blocks of information, i.e., a service code group is transmitted as soon as the transmitting circuit comes free, independently of whether the detector D*t* has detected a confirmation signal during the same cycle and thus signalled to the transmission control circuit that a subsequent block of information has to be transmitted, or the block of information which has just been transmitted must be repeated. The order of priority is as follows:

1st priority—completing of the transmission of a block of information being handled.
2nd priority—stop or start signal.
3rd priority—confirmation good or wrong.
4th priority—a block of information.

The stop signal must have priority over the transmission of a confirmation "good" or "wrong," since otherwise a new or repeated block of information could be transmitted to a transceiver without the information carrier of the writer of this transceiver having sufficient space to receive the block of information.

It may occur that the next block of information already reaches a transceiver before the preceding block of information has been completely read from the reception store OG*h* and transferred to the information carrier by the writer S. The reception store must therefore be designed so that it can immediately store new information at the places coming free through reading.

The normal cycle of events described above may be disturbed in various ways and change to an abnormal cycle of events. These disturbances may be:

(1) The control circuit C*t*S of the receiving station finds an error in a block of information. The reception control circuit OBS in this case transmits a pulse to the reception store OG*h* which causes the information stored therein to be erased; also, the reception control circuit transmits a pulse to the transmission control circuit ZBS requesting to transmit back the confirmation "wrong" to the transmitting station. The number store NG*h* now does not receive a pulse so that the number stored therein is not increased modulo 2 by 1.

(2) The detector D*t* of the transmitting station detects the confirmation "wrong." The transmission control circuit ZBS responds thereto by sending a plurality of pulses to the transmission store ZG*h*, causing it to transmit the block of information stored therein. The receiving station thus receives again the block of information which had already been received but with errors.

(3) The detector D*t* does not receive the confirmation "good" or "wrong" within a determined interval T after the transmission of a block of information, or at least does not recognize the confirmation as such due to distortion thereof. The transmission control circuit ZBS responds thereto in the same manner as to the receipt of the confirmation "wrong."

(4) The comparator C*p* of the receiving station detects an inequality. This case arises if a block of information has been repeated wrongly by the transmitting station because the confirmation "good" has not been received by the transmitting station or has been received with distortion. Irrespective of whether the control circuit C*t*S in this case finds errors or no errors in the repeated block of information, the block then incoming is now not stored in the reception store OG*h*. This is not necessary since the relevant block of information in this case has already been written without errors on the information carrier. In addition, the confirmation "good" or "wrong" is transmitted back to the transmitting station, irrespective of the result of the control circuit C*t*S. Since no pulse is sent to the number store NG*h*, the number stored therein is not increased modulo 2 by 1. This is not allowed because the identification number had already been increased modulo 2 by 1 after termination of the preceding block of information received without errors.

FIGURE 3 shows a possible embodiment of the reception store OG*h* in which it is assumed for the sake of simplicity that each code group has four code elements and the store may have 8 code groups. Rings of a material having a rectangular magnetic hysteresis loop serve as store elements. The information supplied from the receiving circuit OS passes through stored pulse generators $P_1$ to $P_4$, which serve as input gates, and is registered in coincidence with pulses delivered by a shift register $SR_1$. The information stored is transmitted through output gates $Q_1$ to $Q_4$ by the action of pulses delivered by a shift register $SR_2$. A stored pulse generator is to be understood herein to mean a circuit having a set terminal (indicated by a transverse dash through the line representing the wire leading to this terminal), a trigger terminal (indicated by an arrow directed towards the circle representing the circuit) and an output terminal (indicated by an arrow directed away from the circle representing the circuit). The circuit delivers an output pulse only if a pulse of a given polarity is first applied to the set terminal (setting of the pulse generator) and then a pulse of a given polarity is applied to the trigger terminal (triggering of the pulse generator). A stored pulse generator which has not preliminarily been set thus delivers no output pulse upon being triggered and a stored pulse generator once triggered cannot deliver an output pulse until it has been set again. The circuit may be designed so that the pulse generator assumes the set state only if a set pulse is applied to two set terminals simultaneously. This is referred to as setting in coincidence.

The register in the store eight code groups received at the moments $t_1$ of the pulse cycles 2 to 9, eight pulses are applied to the control terminal *a* at the moments $t_4$ of the pulse cycles 1 to 8 and eight pulses to the control terminal *b* at the moments $t_1$ of the pulse cycles 2 to 9. The pulse generators $P_1$ to $P_4$ are set at the beginning of the second pulse cycle. However, at the moment $t_1$ of this pulse cycle, only the pulse generators which receive a pulse from the receiving circuit OS deliver an output pulse of the value $1/2i$. At the same moment the first output terminal of the shift register $SR_1$ also delivers a pulse of the value $1/2i$. Thus the first code group is written in the first column of the store. Similarly the second code group is written in the second column of the store, and so forth.

To transmit the information written in the store, eight pulses must be applied to a control terminal *d*. The shift register $SR_2$ thus delivers 8 pulses of the value *i* while the gates $Q_1$ and $Q_2$ are open at the moments when these pulses occur.

The information stored may be completely erased by applying a pulse of the value *i* to the control terminal *c*.

It will be evident that *i* is the value of the current strength which just suffices for completely magnetizing a magnetic ring.

The transmission store ZG*h* may be of substantially the same design.

FIGURE 4 shows the diagram of a possible embodiment of the reception control circuit OBS. This circuit receives information from the comparator C*p* (0=inequality has been detected; 1=equality has been detected) and from the control circuit C*t*S (0=errors have been found; 1=no errors have been found). The reception control circuit delivers information in the form of pulses to the reception store OG*h* (48 pulses to the control terminals *a* and *b*; 1 pulse to the control terminal *c*; 48 pulses to the control terminal *d*), to the writer S (48 pulses), to the number store NG*h* (1 pulse), to the detector D*t* (1 pulse) and to the transmission control circuit ZBS (0=request for transmitting the confirmation "wrong"; 1=request for transmitting the confirmation "good"). The circuit comprises 20 stored pulse generators $S_1$ to $S_{10}$, $T_1$ to $T_9$, V, two gates $U_1$ and $U_2$ (0=terminal for closing the gate; 1=terminal for opening the gate) and two shift registers $SR_3$ and $SR_4$. The shift register $SR_3$ has a start terminal 2 and two output terminals 3 and 4. After starting, the output terminal 3 delivers a series of 48 pulses and at the end of this pulse series the output terminal 4 delivers a single pulse. The shift register $SR_4$ has a start terminal 5 and two output terminals 6 and 7. After starting, the output terminal 6 delivers a series of 48 pulses and at the end of this pulse series the output terminal 7 delivers a single pulse. The various circuit elements are interconnected in the manner shown. It is also shown for each wire at which moment of the pulse cycles and during which pulse cycles pulses may occur therein. The circuit shown in FIG. 4 is adequate for the purpose, but is not the simplest which may be designed. Thus, the whole may be simplified, for example, by providing for the shift registers $SR_1$ and $SR_3$, on the one hand, and the shift registers $SR_2$ and $SR_4$ on the other, to coincide in part.

The circuit shown in FIGURE 4 operates as follows:

*Case 1.*—The pulse generators $S_1$ and $S_2$ are set at the moment $t_1$ of the pulse cycle 1. The comparator C*p* delivers the result at the moment $t_3$ of the same pulse cycle 1. Let it first be assumed that this is a pulse 1 (equality has been detected). This pulse sets the pulse generator $S_4$ and triggers the pulse generators $S_1$ and $S_2$, which thus each deliver an output pulse since they were in the set state. Consequently, the shift register $SR_2$ is started and the gate $U_1$ opened. The output terminal 3 of the shift register $SR_3$ delivers a series of 48 pulses which are applied to the pulse generators $T_1$ and $T_2$ through the gate $U_1$ which is now open. The control terminal *a* thus receives from the reception store OG*h* a series of 48 pulses which occur at the moments $t_4$ of the pulse cycles 1 to 48 and the control terminal *b* also receives a series of 48 pulses which occur at the moments $t_1$ of the pulse cycles 2 to 49. Consequently, the incoming block of information is stored in the reception store OG*h* except for the first and the last code group. Let it now be assumed that the control circuit C*t*S delivers a pulse at the moment $t_3$ of pulse cycle 50 (no errors have been found). The pulse generator $S_6$ is thus set. The output terminal 4 of shift register $SR_3$ delivers a pulse at the moment $t_4$ of pulse cycle 50 so that the gate $U_1$ is closed, the pulse generators $S_3$ to $S_6$ are triggered and the pulse generator $T_7$ is set. Of the pulse generators $S_3$ to $S_6$, only the pulse generators $S_4$ and $S_6$ deliver a pulse, so that the pulse generator $S_{10}$ is set in coincidence. Coincidence occurs with none of the pulse generators $S_7$, $S_8$ and $S_9$ so that these pulse generators are not set. At the moment $t_5$ of pulse cycle 50, the pulse generator $S_{10}$ is triggered and hence the shift register $SR_4$ started, the gate $U_2$ opened and the pulse generators $T_6$ and $T_9$ set. Thus at the moment $t_6$ of pulse cycle 50 the pulse generators $T_6$, $T_7$ and $T_9$ each deliver a pulse so that the number stored in the number store is increased modulo 2 by 1, the detector becomes operative again and the transmission control circuit receives the request to transmit the confirmation "good." In addition, the output terminal 6 of the shift register $SR_4$ delivers 48 pulses which occur at the moments $t_6$ of the pulse cycles 50 to 97 and are applied to the pulse generators $T_4$ and $T_5$ through the gate $U_2$ which is now open. Consequently, the control terminal *d* of the reception store OG*h* and the writer S each receive 48 pulses which occur at the moments $t_6$ of the pulse cycles 50 to 97. Thereupon, the reception store OG*h* transmits the block of information stored therein which is registered on the information carrier by the writer S. The output terminal 7 of the shift register $SR_4$ delivers a single pulse at the moment $t_6$ of pulse cycle 97. This pulse is shifted by the pulse generator V to the moment $t_7$ of pulse cycle 97 and then used for closing the gate $U_2$. However, if the control circuit CtS delivers a pulse 0 at the moment $t_3$ of pulse cycle 50 (errors found), the pulse generator $S_5$ is set. The pulse generator $S_9$ is now set in coincidence at the moment $t_4$ of the same pulse cycle 50. In addition, the gate $U_1$ is then closed again and the pulse generator $T_7$ set. At the moment $t_5$ of pulse cycle 50, the pulse generator $S_9$ delivers a pulse which sets the pulse generators $T_3$ and $T_8$. However, the shift register $SR_4$ is now not started and the gate $U_2$ remains closed. At the moment $t_6$ of pulse cycle 50, the control terminal *e* of the reception store OG*h* thus received a pulse (which erases the block of information stored therein), the detector D*t* receives a pulse (which makes it operative again) and the transmission control circuit ZBS receives a pulse 0 (request for transmitting the confirmation "wrong").

*Case 2.*—At the moment $t_3$ of pulse cycle 1 the comparator $C_p$ delivers a pulse 0 (inequality detected). Consequently, the pulse generator $S_3$ is set and the pulse generator $S_1$ triggered (not the pulse generator $S_2$). The counting circuit $SR_3$ is started, but because the gate $U_1$ is not open at this time, the reception store OG*h* does not receive pulses and the incoming block of information is not stored in it. At the moment $t_3$ of pulse cycle 50, the control circuit CtS delivers the result and either the pulse generator $S_6$ or the pulse generator $S_5$ is set at the moment $t_4$ of the same pulse cycle 50, the output terminal 4 of the shift register $SR_4$ delivers a single output pulse which triggers the pulse generators $S_3$ to $S_6$ and sets the pulse generator $T_7$. The gate $U_1$ is closed at this moment and keeps closed. Thus, either the pulse generator $S_8$ or the pulse generator $S_7$ is set in coincidence. At the moment $t_5$ of pulse cycle 50 the pulse generators $S_7$ to $S_{10}$ are fired and either the pulse generator $S_8$ or the pulse generator $S_7$ delivers a pulse, thus setting either the pulse generator $T_9$ or the pulse generator $T_8$. At the moment $t_6$ of pulse cycle 50 the detector D*t* thus receives a pulse which makes it operative again and the transmission control circuit receives a pulse requesting to transmit either the confirmation "good" or the confirmation "wrong," depending on whether the control circuit has found no errors or found errors.

It may also be practicable to connect the outputs of the pulse generators $T_8$ and $T_9$ to control terminals of a counting circuit, for example a bidirectional counter, in a manner such that the counting circuit is started by a pulse generator $T_8$ (request for transmitting the confirmation "wrong") but is set back to the zero-position by a pulse from the pulse generator $T_9$ (request for transmitting the confirmation "good"). The output terminal of the counting circuit may then be connected to an alarm circuit A*l*S (FIGURE 1). It is thus ensured that alarm is given if an error in an incoming block of information has been found and thus the confirmation "wrong" has been transmitted back a given number of times in succession (for example twice in succession). This possibility will be described more fully with reference to FIGURE 6.

Figure 5:
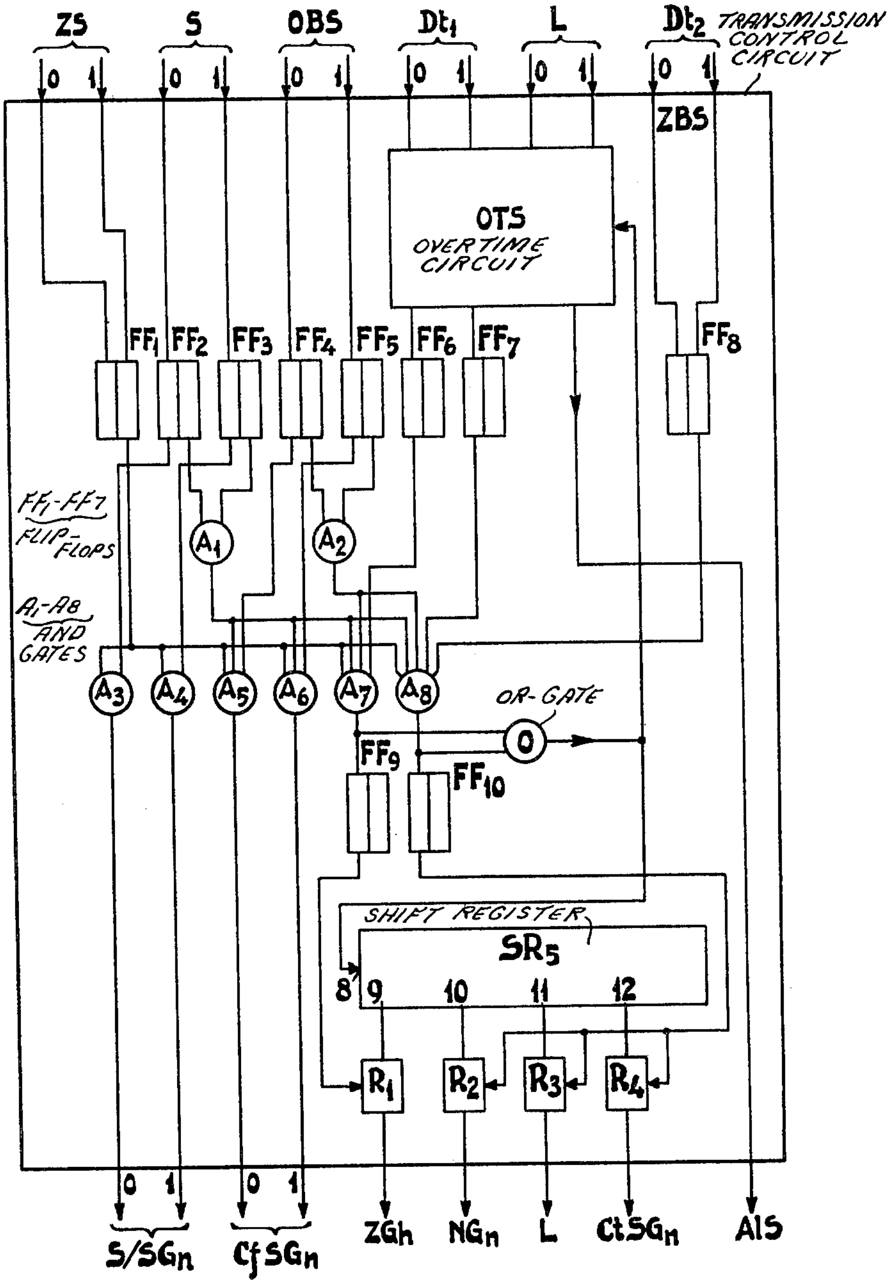

FIGURE 5 shows a possible embodiment of the transmission control circuit ZBS, which comprises 10 flip-flops $FF_1$ to $FF_{10}$, eight and-gates $A_1$ to $A_8$, an or-gate O, an overtime circuit OTS, a shift register $SR_5$ and four gates $R_1$ to $R_4$. These elements are connected together in the manner shown. The transmission control circuit receives information from the transmission circuit ZS (0=transmitting circuit is busy; 1=transmitting circuit is free), from the writer S (0=transmit stop signal because the information carrier is nearing its end; 1=transmit start signal because a blank information carrier has been laid in; the signal 0 may be produced by a contact controlled by the driving mechanism of the information carrier and the signal 1 may be produced by pressing a start button St$Kn_2$ provided on the writer), from the reception control circuit (0=transmit confirmation "wrong," 1=transmit confirmation "good"), from the detector D$t_1$ (0=the confirmation "wrong" has been received, 1=the confirmation "good" has been received), from the reader L (0=stop, the transmission because the information carrier is nearing its end; 1=resume the transmission because a new information carrier has been laid in; the signal 0 may be produced by a contact controlled by the driving mechanism of the information carrier and the signal 1 may be produced by pushing a start knob St$Kn_1$ provided on the reader) and from the detector D$t_2$ (0=the stop signal has been received; 1=start signal has been received). The transmission control circuit ZBS transmits signals to a stop-start signal generator S/SG*h* (0=transmit stop signal; 1=transmit start signal), to a confirmation signal generator C*f*SG*n* (0=transmit confirmation "wrong"; 1=transmit confirmation "good"), to the transmission store ZG*h*, to the number generator NG*n*, to the reader L, to a control signal generator CtSG*n* and to an alarm circuit A*l*S. It is assumed that each signal received by the transmission control circuit is a pulse which occurs once. In view thereof, these signals are applied to the eight flip-flops $FF_1$ to $FF_8$ which serve as store elements which can be read at any time and the information in which is not destroyed on readout. For the signals from the detector D$t_1$ request for transmitting the confirmation "wrong" and request for transmitting the confirmation "good" this is effected through the overtime circuit OTS which also receives and handles the signals delivered by the reader L, but this detail may be disregarded here for the present. The information delivered by the flip-flops $FF_1$ to $FF_8$ is handled logically by the eight and-gates $A_1$ to $A_8$. These gates together form a priority circuit. In fact, it may be seen from FIGURE 5 that none of the and-gates $A_3$ to $A_8$ contains an output signal when the transmitting circuit ZS is busy. This means that a transmission being handled has priority 1, which indicates that the transmission of a block of information is not interrupted by the transmission of a service code group. Also none of the and-gates $A_5$ to $A_8$ delivers an output signal when the writer S has made a request for transmitting the stop signal or start signal, which indicates that the writer S has priority 2. Also neither of the and-gates $A_7$ and $A_8$ delivers an output signal when the reception control circuit OBS has made a request for transmitting the confirmation "wrong" or "good," which indicates that the reception control circuit OBS has priority 3, and the signals from the detector D$t_1$ indicating that "the confirmation wrong has been received" (that is to say the request for repeating the block of information last transmitted by transmitting the contents of the transmission store ZG*h*) and "the confirmation good has been received" (that is to say the request for transmitting a new block of information by causing the reader to read it from the information carrier) thus have the priority 4. Transmission of a new block of information (and-gate $A_8$ delivers a pulse) also, cannot take place if the detector D$t_2$ has detected a stop signal, since this means that the information carrier in the writer of the receiving station is nearing its end and thus cannot receive a new block of information. The transmission of the information stored in the transmission store (and-gate $A_7$ delivers a pulse) may normally go on, however, since this takes place only if the confirmation "wrong" has been received. In this case the block of information last transmitted has been received with errors and hence not been written on the information carrier. The latter thus still has sufficient space when the block of information is repeated.

The pulses delivered by the and-gates $A_3$ to $A_6$ may be applied directly to the relevant terminals of the stop-start signal generator S/SG$n$ and of the confirmation signal generator CFSG$n$. The pulses delivered by the and-gates $A_7$ and $A_8$ are stored, however, in the flip-flops $FF_9$ and $FF_{10}$. These pulses are also applied through the or-gate O to the overtime circuit OTS the function of which will be described in detail hereinafter. The shift register $SR_5$ has a start terminal 8 and four output terminals 9, 10, 11 and 12. Starting of the shift register $SR_5$ results in the output terminal 9 delivering a series of 50 pulses, the output terminal 10 delivering a single pulse which coincides with the first of the pulses delivered by the terminal 9, the output terminal 11 delivering a series of 48 pulses which coincide with the 2nd to 49th pulse delivered by the terminal 9, and the output terminal 12 delivering a single pulse which coincides with the last of the pulses delivered by the terminal 9. The shift register $SR_5$ is thus started if either the and-gate $A_7$ or the and-gate $A_8$ delivers output pulses, that is to say, if a block of information has to be transmitted either by reading the transmission store ZG$h$ or by causing the reader L to read 48 code groups of the information carrier and adding thereto a running number and a control symbol. If the and-gate $A_7$ delivers pulses, the transmission store ZG$h$ receives a series of 50 pulses since the gate $R_1$ is then open. If the and-gate $A_8$ delivers pulses the number generator NG$n$ first receives a pulse, then the reader L receives 48 pulses and then the control symbol generator C$t$SG receives a pulse since the gates $R_2$, $R_3$ and $R_4$ are open.

Figure 6:
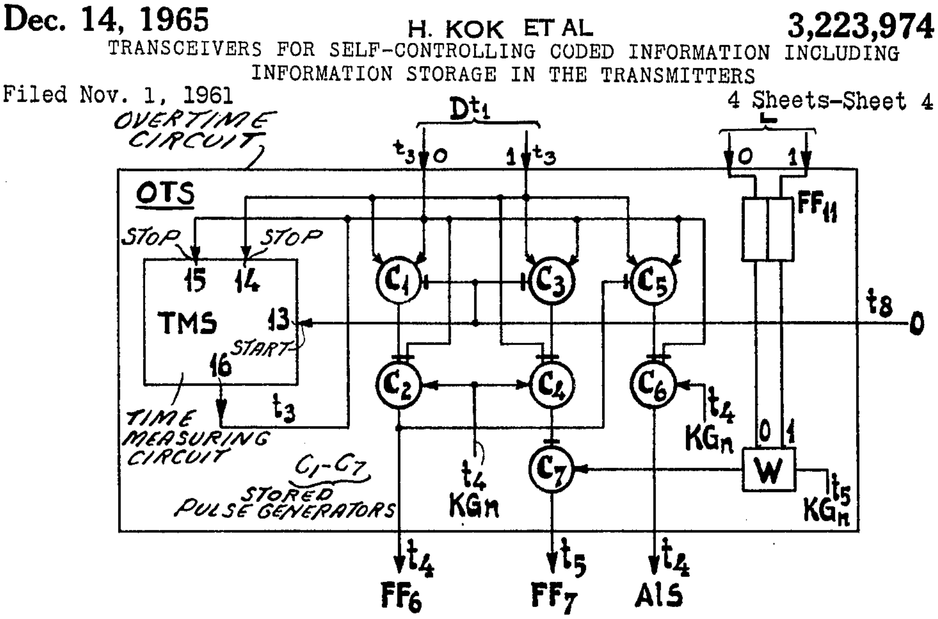

FIGURE 6 shows a possible embodiment of the overtime circuit OTS. This circuit receives signals from the detector D$t_1$ (0=the confirmation "wrong" has been received; 1=the confirmation "good" has been received), from the reader L (0=stop the transmission because the information carrier is nearing its end; 1=resume the transmission because a new information carrier has been laid in) and from the or-gate O (FIGURE 5) which delivers a pulse if one of the two and-gates $A_7$ and $A_8$ has delivered a pulse, i.e., if the transmission control circuit has received the request for transmitting a repeated or non-repeated block of information. The overtime circuit normally transmits a signal delivered by the detector D$t_1$ except if the reader L has delivered the signal "stop transmission," in which event the signal to the flip-flop $FF_7$ is blocked. The transmission control circuit ZBS is thus prevented from sending an instruction for reading to the reader L when the information carrier is nearing its end. The overtime circuit OTS also has the function to ensure that the block of information last transmitted is repeated if the confirmation "good" or the confirmation "wrong" has not been detected within a given period after the transmission of a block of information. A confirmation symbol not being received or not being recognized as such by the detector due to distortion is thus regarded by the overtime circuit to be equal to the reception of the confirmation "wrong."

The circuit arrangement is built up of a time measuring circuit TMS, seven stored pulse generators $C_1$ to $C_7$, a flip-flop $FF_{11}$ and a gate W (0=terminal for closing the gate; 1=terminal for opening the gate), which elements are circuited in the manner shown. The time measuring circuit TMS has four terminals, viz a start terminal 13, two stop terminals 14 and 15 and an output terminal 16. It is designed so that it is started by applying a start pulse to its start terminal 13. After lapse of a given time interval T it then delivers automatically an output pulse at the output terminal 16, unless a pulse has been applied to one of its stop terminals 14 and 15 before expiration of this time interval, in which events the time measuring circuit is set back again to a starting or zero-position. The delivery of an output pulse also sets the time measuring circuit back to the starting or zero-position. The time measuring circuit may otherwise be either of electromechanical or electronic nature and be built up on known principles. The time interval T has been chosen so that the confirmation signal relating to a block of information should have been received within a time interval T after the beginning of the transmission thereof and the non-occurrence of the said signal indicates a disturbance in the transmission of information. Consequently, T must be a little greater than double the time in which a block of information can be transmitted.

The circuit operates as follows: When a block of information is transmitted, the or-gate O delivers a pulse since this is effected either by reading the transmission store ZG$h$ (and-gate $A_7$ delivers pulses) or by causing the reader to read 48 code groups and adding thereto an identification number and a control symbol (and-gate $A_8$ delivers pulses). The time measuring circuit TMS is then started and the pulse generators $C_1$ and $C_3$ are set. Let it be assumed that the confirmation "good" is detected by the detector D$t_1$ (signal 1) after transmission of the block of information. This results in the pulse generator $C_3$ being triggered and delivering an output pulse which sets the pulse generator $C_4$ in coincidence with the triggering pulse itself. At the next moment $t_4$ the pulse generator $C_4$ is fired by a clock pulse delivered by a clock pulse generator KG$n$ and the output pulse of the pulse amplifier $C_4$ sets the pulse generator $C_7$. The latter is fired at the next moment $t_5$ by a pulse then also delivered by the clock pulse generator KG$n$, but this pulse passes through a gate W which is open only if the reader L has delivered last the start signal (signal 1) and thus occupies the state in which it can read 48 new code groups of the information carrier. However, if the information carrier of the reader L is nearing its end, the stop signal (signal 0) is delivered so that the flip-flop $FF_{11}$ flips into the position in which the gate W is closed. This lasts until the start signal is received again. The reader L can thus never receive instruction for reading when the information carrier has already been read completely.

When the detector D$t_1$ has received the confirmation "wrong" (signal 0), first the pulse generator $C_1$ and then the pulse generator $C_2$ delivers a pulse in a similar manner. The time measuring circuit TMS is set back to the zero-position in either case when the detector D$t_1$ has received the confirmation "good" or the confirmation "wrong." However, if the confirmation signal is not received in due time, the time measuring circuit TMS delivers an output pulse having exactly the same effect as the confirmation "wrong."

The pulse generators $C_5$ and $C_6$ together form a bi-directional counter which is started by a pulse delivered by the pulse generator $C_2$ (confirmation "wrong" has been detected or a confirmation signal has not been detected in time), and which is set back to the zero position by a confirmation "good" (signal 1) detected by the detector D$t_1$. The output of the said counter is connected to an alarm circuit A$l$S. Thus, alarm is given as soon as the confirmation "wrong" has been received or no confirmation has been received twice in succession.

Figure 7:
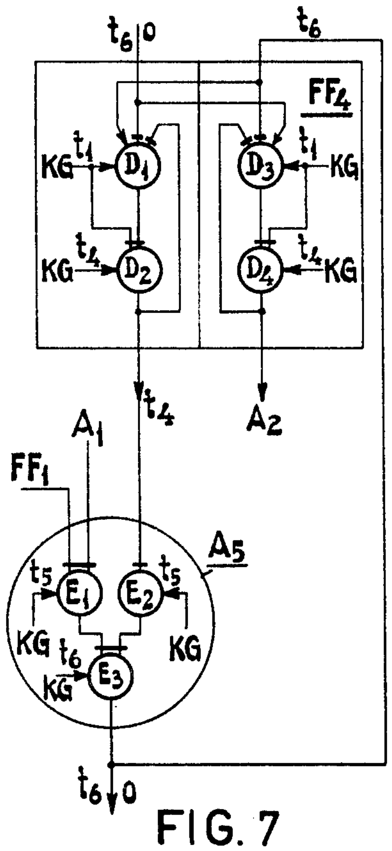

The transmission control circuit must be such that each of the flip-flops $FF_1$ to $FF_7$, $FF_9$ and $FF_{10}$ is set back to the zero position when the information originating from the flip-flop has been handled. FIGURE 7 shows how this can happen for the flip-flop $FF_4$. The flip-flop $FF_4$ comprises two pairs of stored pulse generators $D_1$, $D_2$ and $D_3$, $D_4$ respectively, each pair functioning as a pulse gate. The pulse gate $D_1$, $D_2$ is opened by a pulse delivered by the reception control circuit OBS, requesting to transmit the confirmation "wrong," and closed by a pulse delivered by the and-gate $A_5$. The pulse gate $D_3$, $D_4$ is opened by a pulse delivered by the and-gate $A_5$ and closed by a pulse delivered by the reception control circuit OBS, requesting to transmit the confirmation "wrong." The pulse gate $D_1$, $D_2$ is thus opened and the pulse gate $D_3$, $D_4$ closed by the reception of this request. However, as soon as the relevant signal has been handled, i.e., as soon as the and-gate $A_5$ delivers an output pulse, the pulse gate $D_1$, $D_2$ is closed and the pulse gate $D_3$, $D_4$ is opened.

The and-gate $A_5$ comprises two stored pulse generators $E_1$, $E_3$, which may be set in coincidence, and an ordinary stored pulse generator $E_2$. The operation of the circuit may readily be seen from the figure.

Figure 8:
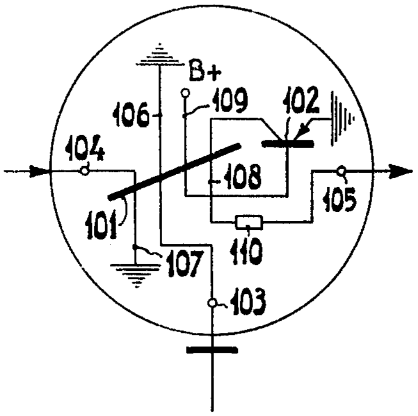

FIGURE 8 shows the diagram of a possible embodiment of a stored pulse generator which also has an amplifying function. FIGURE 8 shows an annular core 101 of magnetic material having a rectangular hysteresis loop, a pnp-transistor 102, a set terminal 103, a trigger terminal 104, an output terminal 105, a set winding 106 of the core 101, which is connected to the set terminal 103, a triggering winding 107 of the core 101, which is connected to the triggering terminal 104, a feedback winding 108 of the core 101, which is connected to the collector of the transistor 102 and, if desired through a current-limiting resistor 110, to the output terminal 105, and a control winding 109 of the core 101, which is connected to a positive voltage source $B_+$ and to the base of the transistor 102. Each of the various windings may comprise more than one turn and need therefore not necessarily consist of a wire threading only once through the core 101. The winding senses of the various windings may be seen in FIGURE 6 from the manner in which the corresponding lines intersect the heavy line segment 101. The circuit shown in FIGURE 6 operates as follows: Let it be assumed that a current pulse of sufficient amplitude is applied to the set terminal 103. The ring 101 is thus magnetized in a given winding sense and thus assumes a state of magnetization which will be referred to as the state 1. When, subsequently, a pulse is applied to the trigger terminal 104, the ring 101 begins to flop to the state 0. This results in a voltage being induced in the control winding 109, which voltage exceeds the voltage of the positive voltage source $B_+$ so that the base of transistor 102 becomes negative relative to its emitter. The transistor thus becomes conducting, which results in current flowing through the feedback winding 108 and the pulse amplifier delivering an output pulse. The current through the feedback winding 108 may completely take over the action of the current through the trigger winding 107. The core of a stored pulse amplifier which has preliminarily been set is thus always completely set to the position 0 by triggering the core, even though the trigger pulse has already ended before the core 101 has reached the position 0. By suitable proportioning it may be ensured that the pulse amplifier delivers output pulses having a duration and amplitude which are sharply defined at least within certain limits. It will be evident that the pulse amplifier may also be provided with two or more trigger windings acting independently of each other and each connected to a separate trigger terminal. Similarly, the pulse amplifier may be provided with two or more set terminals each connected to a separate set winding. The arrangement may be such that the pulse amplifier may be brought into the set state by applying a pulse to one of its set terminals; alternatively, the pulse amplifier may be brought into the set state only by applying a pulse to two of its set terminals simultaneously (setting in coincidence).

While various embodiments have been disclosed, it is to be understood that the invention may be practiced in a manner other than specifically described, the inventive concept being set forth in the appended claims.

What is claimed is:

1. A system for transmitting, through a telecommunication channel, self-controlling coded digital information in the form of information blocks each comprising a predetermined number of code groups, comprising in combination: a transmitting station including an information carrier, a sensing device for reading the information on said carrier, a transmission store for storing the information, a transmission control circuit, a first detector, an overtime circuit, and a number generator, a receiving station including a receiving control circuit, a confirmation signal generator, a second detector, a comparator, and a number store, said transmission control circuit being operative to start transmission and to halt transmission after a block of information has been transmitted, said transmission control circuit controlling said number generator to provide each block of information with a service code-group occurring at the beginning thereof, which service code-group is chosen in cyclic sequence from determined code-groups, said second detector acting to detect a particular service code-group denoted an identification number, said number store having a number stored therein, said comparator comparing the identification number detected by the second detector and the number stored in the number store and signalling the result of this comparison to the receiving control circuit which increases the number stored in the number store by a predetermined amount if the comparator detects equality, said receiving control circuit also controlling the confirmation signal generator to transmit back to the transmitting station confirmation signals denoting the reception of error-containing information or of true information, said first detector being operative to detect and distinguish said confirmation signals and to signal said transmission control circuit to start said overtime circuit at the beginning or at the end of transmission of a block of information, said overtime circuit being set back to a starting position by a distinctive confirmation signal detected by said first detector within a predetermined time interval, the transmission control circuit being responsive to a distinctive confirmation signal to transmit the next block of information or to retransmit from the transmission store a block of information which was just transmitted.

2. A system for transmitting, through a telecommunication channel, self-controlling coded digital information in the form of information blocks each comprising a predetermined number of code groups, comprising in combination: a transmitting station including an information carrier, a sensing device for reading the information on said carrier, a transmission store for storing the information, a transmission control circuit, a first detector, an overtime circuit, and a number generator, a receiving station including a receiving control circuit, a confirmation signal generator, a second detector, a comparator, and a number store, said transmission control circuit being operative to start transmission and to halt said transmission after a block of information has been transmitted, said transmission control circuit controlling said number generator to provide each block of information with a service code-group occurring at the beginning thereof, which service code-group is chosen in cyclic sequence from determined code-groups, said second detector acting to detect a particular service code-group denoted an identification number, said number store having a number stored therein, said comparator comparing the identification number detected by the second detector and the number stored in the number store and signalling the result of this comparison to the receiving control circuit which increases the number stored in the number store by a predetermined amount if the comparator detects equality, said receiving control circuit also controlling the confirmation signal generator to transmit back to the transmitting station confirmation signals denoting the reception of error-containing information or of true information, said first detector being operative to detect and distinguish said confirmation signals and to signal said transmission control circuit to start said overtime circuit at the beginning or at the end of transmission of a block of information, said overtime circuit being set back to a starting position by a distinctive confirmation signal detected by said first detector within a predetermined time interval, the transmission control circuit being responsive to a distinctive confirmation signal to transmit the next block of information or to retransmit from the transmission store a block of information which was just transmitted, said second detector becoming inoperative upon detection of a service code-group corresponding to a particular running number, and which becomes operative again in response to said receiving control circuit upon the reception of a complete block of information.

3. A system for transmitting, through a telecommunication channel, self-controlling coded digital information in the form of information blocks each comprising a predetermined number of code groups, comprising in combination; a transmitting station including an information carrier, a sensing device for reading the information on said carrier, a transmission store for storing the information, a transmission control circuit, a first detector, an overtime circuit, and a number generator, a receiving station including a receiving control circuit, a confirmation signal generator, a second detector, a comparator, a number store, and a reception store, said transmission control circuit being operative to start transmission and to halt said transmission after a block of information has been transmitted, said transmission control circuit controlling said number generator to provide each block of information with a service code-group occurring at the beginning thereof, which service code-group is chosen in cyclic sequence from determined code-groups, said second detector acting to detect a particular service code-group denoted an identification number, said number store having a number stored therein, said comparator comparing the identification number detected by the second detector and the number stored in the number store and signalling the result of this comparison to the receiving control circuit which increases the number stored in the number store by a predetermined amount if the comparator detects equality, said receiving control circuit also controlling the confirmation signal generator to transmit back to the transmitting station confirmation signals denoting the reception of error-containing information or of true information, said first detector being operative to detect and distinguish said confirmation signals and to signal said transmission control circuit to start said overtime circuit at the beginning or at the end of transmission of a block of information, said overtime circuit being set back to a starting position by a distinctive confirmation signal detected by said first detector within a predetermined time interval, the transmission control circuit being responsive to a distinctive confirmation signal to transmit the next block of information or to retransmit from the transmission store a block of information which was just transmitted, an incoming block of information being stored in said reception store, said receiving control circuit acting to release said stored information for further processing if no errors have been detected and to erase said stored information if errors were detected.

4. A system as claimed in claim 3, wherein said incoming block of information is not stored in the reception store if the comparator has found the comparison unequal.

5. A system for transmitting self-controlling coded digital information in the form of information blocks each comprising a predetermined number of code groups through a telecommunication channel, which information is read by a reader from an information carrier in the transmitting station, the receiving station comprising a receiving control circuit which controls the incoming information as to errors and a confirmation signal generator which, under control of the receiving control circuit, transmits a signal back to the transmitting station if the control circuit finds an error in the transmitted information, the transmitting station responding to the signal by repeating parts of the information already transmitted by reading it from a transmission store in which the transmitted information is stored for some time, the transmitting station including a transmission control circuit acting to automatically halt the transmission of information when a block of information has been transmitted, the receiving control circuit controlling each block of information as to errors, the confirmation signal generator, after receipt of a block of information, transmitting back either the service code-group "confirmation good" or the service code-group "confirmation wrong" to the transmitting station according to whether or not the control circuit has found errors in the incoming block of information, the transmitting station comprising a detector which is operative to detect and distinguish the confirmation signals from one another, the control circuit of the transmitting station being connected to the detector and acting to transmit the next block of information by means of the reader upon receipt of the confirmation "good" and retransmit the block of information which has just been transmitted by reading the transmission store upon receipt of the confirmation "wrong," substantially identical transceivers being at each end of said channel, the control circuit of each transceiver comprising a plurality of storage elements in which the received or detected signals may be stored, and a priority circuit for giving first priority to the transmission of a block of information being handled, second priority to the transmission of a service code-group corresponding to a confirmation signal and third priority to the transmission of a new block of information by the reader or to the re-transmission of a block of information from the transmission store.

References Cited by the Examiner

UNITED STATES PATENTS 3,001,017 9/1961 Dirks ............ 178—23.1

DAVID G. REDINBAUGH, *Primary Examiner.*

UNITED STATES PATENT OFFICE
CERTIFICATE OF CORRECTION

Patent No. 3,223,974 December 14, 1965

Hans Kok et al.

It is hereby certified that error appears in the above numbered patent requiring correction and that the said Letters Patent should read as corrected below.

Column 4, line 19, for "the", first occurrence, read -- be --; column 5, line 66, for "configuration" read -- confirmation --; column 7, line 41, for "The" read -- To --; column 9, line 23, for "$C_p$" read -- Cp --; line 31, after "set" insert a period; line 32, for "at" read -- At --.

Signed and sealed this 17th day of January 1967.

(SEAL)
Attest:

ERNEST W. SWIDER
Attesting Officer

EDWARD J. BRENNER
Commissioner of Patents